US008666059B2

(12) United States Patent
Gernegross et al.

(10) Patent No.: US 8,666,059 B2
(45) Date of Patent: Mar. 4, 2014

(54) METHOD AND DEVICE FOR PROCESSING DATA AND TO A COMMUNICATION SYSTEM COMPRISING SUCH DEVICE

(75) Inventors: Dietmar Gernegross, Oberhaching (DE); Werner Kozek, Vienna (AU); Josef Mück, München (DE)

(73) Assignee: Nokia Siemens Networks OY, Espoo (FI)

( * ) Notice: Subject to any disclaimer, the term of this patent is extended or adjusted under 35 U.S.C. 154(b) by 797 days.

(21) Appl. No.: 12/744,108

(22) PCT Filed: Nov. 18, 2008

(86) PCT No.: PCT/EP2008/065754
§ 371 (c)(1),
(2), (4) Date: Jul. 8, 2010

(87) PCT Pub. No.: WO2009/065828
PCT Pub. Date: May 28, 2009

(65) Prior Publication Data
US 2010/0278330 A1    Nov. 4, 2010

(30) Foreign Application Priority Data

Nov. 21, 2007 (EP) .................................. 07022626

(51) Int. Cl.
*H04M 7/00* (2006.01)
*H04B 1/38* (2006.01)
*H04M 1/74* (2006.01)
*H04M 3/34* (2006.01)

(52) U.S. Cl.
USPC ........ 379/416; 375/220; 379/93.01; 379/326; 379/417

(58) Field of Classification Search
USPC ......................... 375/220, 254, 285, 296, 346; 379/90.01, 93.01, 325, 326, 327
See application file for complete search history.

(56) References Cited

U.S. PATENT DOCUMENTS

| 5,086,423 | A | * | 2/1992 | Streit et al. | 379/417 |
|---|---|---|---|---|---|
| 7,590,182 | B2 | * | 9/2009 | Ling et al. | 375/260 |
| 7,852,742 | B2 | * | 12/2010 | Schenk | 370/201 |
| 8,077,788 | B2 | * | 12/2011 | Hum et al. | 375/262 |
| 8,126,042 | B2 | * | 2/2012 | Schenk et al. | 375/227 |
| 8,265,212 | B2 | * | 9/2012 | Hum et al. | 375/347 |

(Continued)

FOREIGN PATENT DOCUMENTS

DE    102006041454 A1    4/2007

OTHER PUBLICATIONS

Zinke et al., "Lehrbuch für Hochfrequenztechnik" Band 1, Springer 1986—English abstract.

(Continued)

*Primary Examiner* — Harry Hong
(74) *Attorney, Agent, or Firm* — Laurence A. Greenberg; Werner H. Stemer; Ralph E. Locher

(57) ABSTRACT

A method and a device process data transmitted via a channel. The channel is at least partially represented by a symmetrical transfer matrix, wherein at least one off-diagonal matrix element of the transfer matrix is determined by its symmetric and/or transposed off-diagonal matrix element and its corresponding diagonal matrix elements of the transfer matrix. In addition, a communication system is provided containing such a device.

15 Claims, 1 Drawing Sheet

(56) References Cited

U.S. PATENT DOCUMENTS

| | | | |
|---|---|---|---|
| 8,494,037 B2* | 7/2013 | Turner et al. | 375/224 |
| 2002/0027985 A1* | 3/2002 | Rashid-Farrokhi | 379/417 |
| 2005/0027491 A1* | 2/2005 | Fertner et al. | 702/196 |
| 2007/0133723 A1* | 6/2007 | Cheong et al. | 375/346 |
| 2008/0089396 A1* | 4/2008 | Zhang et al. | 375/220 |
| 2009/0220228 A1* | 9/2009 | Popovic | 398/48 |

OTHER PUBLICATIONS

Zeng et al., "Crosstalk Identification in xDSL Systems", IEEE Journal on Selected Areas in Communications, vol. 19, No. 8, Aug. 2001, pp. 1488-1496.

Louveaux et al., "Error Sign Feedback as an Alternative to Pilots for the Tracking of the FEXT Transfer Functions in Downstream VDSL", EURASIP Journal on Applied Signal Processing vol. 2006, Article ID 94105, pp. 1-14.

ITU-T G.993.1, "Very high speed digital subscriber line transceivers", Jun. 2004, 228 pages.

ITU-T G.993.2, "Very high speed digital subscriber line transceivers 2 (VDSL2)", Feb. 2006, 252 pages.

Bin Lee et al., "Binder MIMO Channels" IEEE Transactions on Communications, vol. 55, No. 8, Aug. 2007, pp. 1617-1628, XP011190563, ISSN: 00906778, *p. 1620, right column, line 16-line 44** p. 1623, paragraph B.1*.

Bin Lee et al., "Gigabit DSL" IEEE Transactions on Communications, vol. 55, No. 9, Sep. 2007, pp. 1689-1692, XP011192274, ISSN: 00906778.

Moreno, "Exploiting Spatial Diversity in Cooperative Copper Units" Acoustics Speech and Signal Processing, 2005, Proceedings (ICASSP '05), IEEE International Conference, Philadelphia, Pennsylvania, IEEE vol. 3, Mar. 18, 2005, pp. 897-900, XP010792392, ISBN: 978-0-7803-8874-1.

* cited by examiner

METHOD AND DEVICE FOR PROCESSING DATA AND TO A COMMUNICATION SYSTEM COMPRISING SUCH DEVICE

BACKGROUND OF THE INVENTION

Field of the Invention

The invention relates to a method and to a device for processing data and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream—12 Mbit/s in upstream with asymmetric access.

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

A multiple-input-multiple-output system (hereinafter referred to as MIMO system) is of significant importance in modern communication technology. Such MIMO system allows to model crosstalk interference of a telecommunication system.

FIG. 1 illustrates in particular crosstalk comprising NEXT and FEXT components between a central office (CO) comprising several transceivers COO to CON and several Customer Premises Equipments CPEO to CPEN, connected via a Cable Binder.

An impact of NEXT can be reduced by utilizing frequency-division duplex between upstream and downstream direction. Current VDSL2 deployments are (indirectly) FEXT limited due to the choice of a relatively conservative Power Spectral Density (PSD) mask, thereby allowing to reduce NEXT in conjunction with a strong loop attenuation at frequencies beyond 1 MHz.

Downstream precompensation (achieved in particular by precoding) or upstream cancellation may allow utilization of more aggressive PSD masks (in particular with full binder deployments); at least, improvements regarding the reach and/or the data rate can be achieved by reducing crosstalk at existing PSD levels.

In particular regarding wired MIMO processing in VDSL2-based broadband access platforms there is an ongoing need for further ways to reduce crosstalk and/or interference (alien noise of any kind) in order to provide higher data rate at a given loop length or a higher reach at a given data rate.

BRIEF SUMMARY OF THE INVENTION

The problem to be solved is to overcome the disadvantages as pointed out before and in particular to provide an efficient approach to reduce alien noise over a communication channel.

This problem is solved according to the features of the independent claims. Further embodiments result from the depending claims.

In order to overcome this problem, a method for processing data transmitted via a channel is provided
  wherein said channel is at least partially represented by a symmetrical transfer matrix,
  wherein at least one off-diagonal matrix element of the transfer matrix is determined by its symmetric and/or transposed off-diagonal matrix element and its corresponding diagonal matrix elements of the transfer matrix.

The method for processing data may in particular be or comprise noise processing of any kind.

Hence, this approach efficiently allows to process data that may in particular be conveyed via said communication channel and/or data that has been transmitted (and is received) via said communication channel in particular to cancel and/or reduce alien noise and/or self FEXT that may in particular be based on crosstalk effects from adjacent communication channels.

This concepts allows to reduce the computational efforts required for processing data by the transfer matrix in order to compensate (by means of precoding and/or cancellation) alien noise and/or self FEXT. Based on values of an off-diagonal element and the corresponding diagonal element the transposed off-diagonal elements of the transfer matrix can be determined thereby significantly reducing the overall computational power required for processing the transfer matrix.

In an embodiment, the at least one off-diagonal matrix element of the transfer matrix is determined by $$H(n, k) = H(k, n) \cdot \frac{H(n, n)}{H(k, k)}$$

wherein

H(n,k), H(k,n) are off-diagonal entries of the transfer matrix,

H(k,k), H(n,n) are diagonal parts of the transfer matrix.

In another embodiment, the transfer matrix represents and/or is associated with wires of a cable binder.

In a further embodiment, the data is processed by utilizing said transfer matrix for noise cancellation purposes and/or for precoding purposes. Said noise may in particular comprise crosstalk and/or interference and/or alien noise.

In a next embodiment, the communication channel connects a central office (CO) (and/or a DSLAM) and at least two customer premises equipments (CPE).

It is also an embodiment that the communication channel connects at least one transmitter with at least one receiver.

Pursuant to another embodiment, the method may be used in a MIMO environment, in particular comprising digital subscriber lines and/or mobile radio links.

The problem stated above is also solved by a device for data processing comprising a processor unit that is equipped and/or arranged such that the method as described herein is executable on said processor unit.

According to an embodiment, the device is or is associated with a communication device, in particular a Central Office, a Digital Subscriber Line Access Multiplexer or a Customer Premises Equipment.

According to yet another embodiment, the device comprises means for noise processing, in particular a precoder and/or a noise canceller.

The problem stated supra is further solved by a communication system comprising the device as described herein.

Embodiments of the invention are shown and illustrated in the following figure:

DESCRIPTION OF THE INVENTION

A reciprocity theorem of electromagnetic wave propagation notes that a channel between two antennas is identical for pairing of receive and submit antennas (see [1] for details). Such approach may not be applicable to a crosstalk situation of DSL loops, because a wire pair per definition comprises two antennas that are coupled with a termination impedance. As the termination impedance depends on the link state of the CPE, DSL crosstalk may not be consistent with the reciprocity approach as suggested.

However, regarding NEXT coupling of loops that are not too short (i.e. potential reflections shall be less relevant than NEXT coupling itself), the reciprocity approach may advantageously be applicable.

Preferably, ports that are not connected (for whatever reason) may not have to be regarded for MIMO signal processing.

Figure 1:
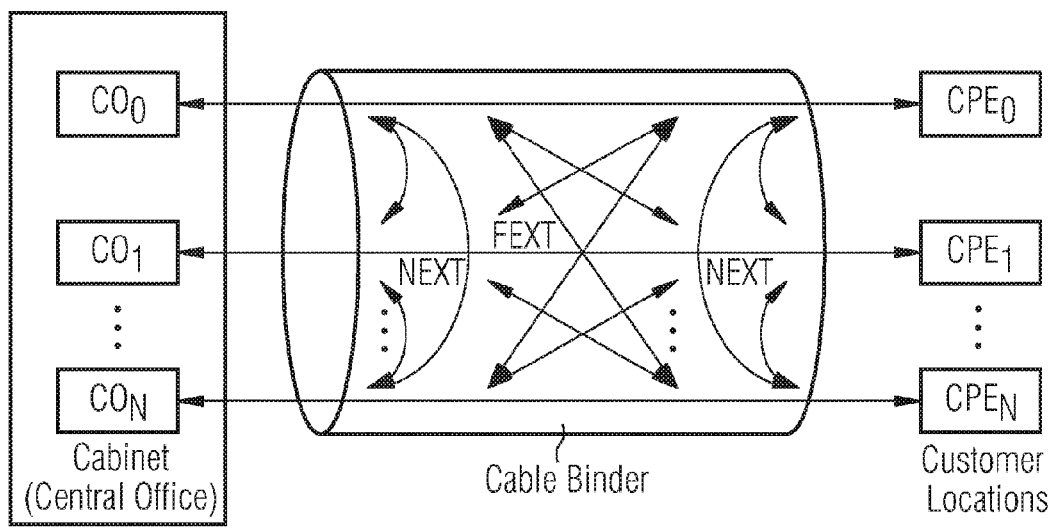
FIG. 1 is an illustration showing crosstalk between a central office and equipment at several customer premises.
Figure 2:
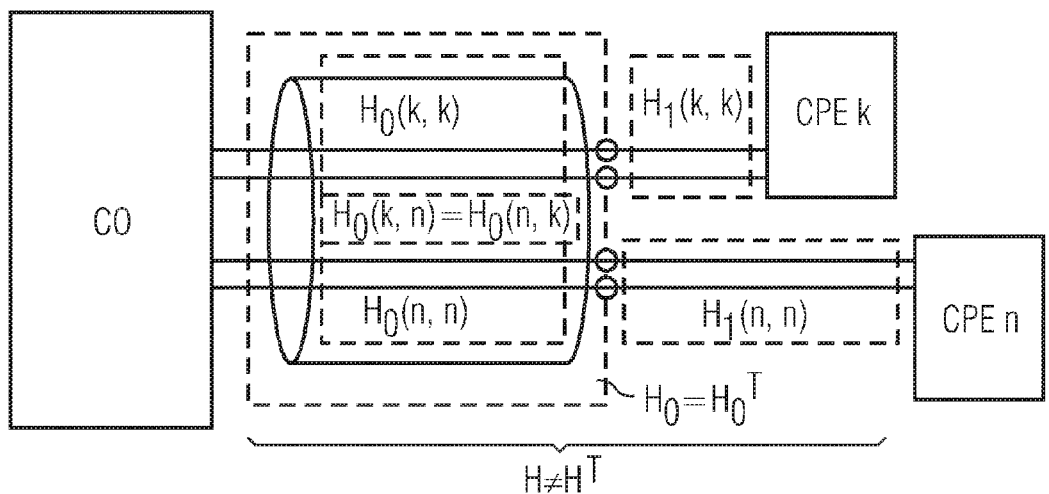
FIG. 2 shows a Central Office CO that is connected via a copper pair with a CPE k and via a copper pair with a CPE n, wherein a communication channel between the CO and the CPEs is described by a transfer matrix H which is separated into a transfer matrix $H_0$ for the cable binder and a transfer matrix $H_1(k,k)$ for the remaining connection from the cable binder to the CPEs.

For FEXT coupling and considerable loop length differences, a reciprocity is no admissible approximation. FIG. 2 shows a Central Office CO that is connected via a copper pair with a CPE k and via a copper pair with a CPE n. The communication channel between the CO and the CPE k as well as the CPE n is described by a transfer matrix H which is separated into a transfer matrix $H_0$ for the cable binder and a transfer matrix $H_1(k,k)$ for the remaining connection from the cable binder to the CPEs. Accordingly, a transfer matrix $H_1(n,n)$ is shown for the remaining connection from the cable binder to the CPE n. In the example of FIG. 2, the cable for the remaining connections to the CPE k and to the CPE n differ in length.

Advantageously, the communication channel may be split into a symmetrical binder part represented by the transfer matrix $H_0$ comprising substantially equal loop length and into the separated loops $H_1(k,k)$ and $H_1(n,n)$.

The symmetrical cable binder part may obey the stipulation of reciprocity according to:

$$\frac{H(n, k)}{H(k, n)} = \frac{H(n, n)}{H(k, k)}, \tag{1}$$

wherein H(k,k), H(n,n) are diagonal parts of the transfer matrix (in particular referred to as MIMO matrix), that are in particular based on measurement and/or tracking during standard SISO (single input single output) DSL transmission. H(n,k) H(k,n) correspond to the off-diagonal parts of the transfer matrix. These may be determined by a special MIMO estimation procedure (see, e.g., [2], [3] or [4]).

An advantage of equation (1) is that the estimation variance can be reduced by 3 dB by averaging over two individual estimates after a normal update iteration according to $$H(n, k)_{new} = \frac{1}{2} \cdot \left( H(n, k)_{old} + H(k, n)_{old} \cdot \frac{H(n, n)}{H(k, k)} \right) \tag{2}$$

and $$H(k, n)_{new} = \frac{1}{2} \cdot \left( H(k, n)_{old} + H(n, k)_{old} \cdot \frac{H(n, n)}{H(k, k)} \right). \tag{3}$$

In particular, regarding a DSL scenario or environment utilizing a substantially symmetrical cable binder in combination with further arbitrary loop length (remaining connections from the cable binder to each CPE), the off-diagonal element H(k,n) of the transfer matrix can be determined by its transposed off-diagonal element H(n,k) of the transfer matrix. The corresponding diagonal elements result from:

$$H(n, k) = H(k, n) \cdot \frac{H(n, n)}{H(k, k)}. \tag{4}$$

Equation (4) is in particular applicable over the whole frequency range.

It is assumed that the communication may be split into a symmetrical portion of the cable binder $H_0(k,n)$ and into FEXT-free loop tails connecting the cable binder to the CPEs, comprising the transfer functions $H_1(k,k)$ and $H_1(n,n)$.

A FEXT contribution from a port n to a port k is set forth according to (see also FIG. 2)

$$H(k,n) = H_0(k,n) \cdot H_1(k,k) \tag{5}$$

and accordingly the FEXT contribution from the port k to the port n is provided by $$H(n,k) = H_0(n,k) \cdot H_1(n,n) \tag{6}.$$

The FEXT-free loop tails contribute to the diagonal of the transfer matrix as well:

$$H(k,k)=H_0(k,k)\cdot H_1(k,k) \quad (7)$$

$$H(n,n)=H_0(n,n)\cdot H_1(n,n) \quad (8).$$

Assuming that the wires within the cable binder have equal length and equal cable type leads to $$H_0(n,n)=H_0(k,k) \quad (9).$$

Thus, formulating a quotient of equation (7) and equation (8) results in $$\frac{H(k,k)}{H(n,n)} = \frac{H_1(k,k)}{H_1(n,n)}. \quad (10)$$

Accordingly, a reciprocity of the cable binder part matrix $H_0$ can be assumed, i.e.

$$H_0(k,n)=H_0(n,k) \quad (11).$$

Hence, a quotient of equation (5) and equation (6) results in $$\frac{H(k,n)}{H(n,k)} = \frac{H_1(k,n)}{H_1(n,n)}. \quad (12)$$

Combining equation (10) and equation (12) leads to equation (4).

ABBREVIATIONS

CO Central Office
CPE Customer Premises Equipment
DMT Discrete Multi-Tone (the modulation format of, e.g., VDSL2)
DSLAM Digital Subscriber Line Access Multiplexer
DSM Dynamic Spectrum Management
FEQ Frequency Domain Equalizer (module of up/downstream receiver)
FEXT Far-End Crosstalk
FFT Fast Fourier Transform
MIMO Multiple Input Multiple Output
NEXT Near-End Crosstalk
QAM Quadrature Amplitude Modulation
SISO Single-Input-Single-Output system such as underlying standard ADSL, VDSL2
SNR Signal-to-Noise Ratio

REFERENCE(S)

[1] O. Zinke, H. Brunswig: "Lehrbuch für Hochfrequenztechnik", Band 1, Springer, 1986.
[2] C. Zeng, C. Aldana, A. A. Salvekar, J. M. Cioffi, "Crosstalk Identification in xDSL Systems", Journal on Selected Areas in Communications, Vol. 19, No. 8, August 2001.
[3] J. Louveaux, A.-J-van der Veen, "Error Sign Feedback as an Alternative to Pilots for the Tracking of FEXT Transfer Functions in Downstream VDSL", EURASIP Journal on Applied Signal Processing, Article ID 94105, p. 1-14, Vol. 2006.
[4] DE 10 2006 041 454 (Mar. 4 2007)

The invention claimed is:

1. A method for processing data transmitted via a communication channel connecting a central office and equipment at at least two customer premises, the communication channel having a first portion from the central office via a cable binder and a second portion from the cable binder to the equipment at the customer premises, which comprises the steps of:
   in a device for processing data having a processor unit, representing the communications channel via a transfer matrix having a first transfer matrix for the first portion and a second transfer matrix for the second portion; and
   in the device for processing data, determining at least one off-diagonal matrix element of the transfer matrix by at least one of its symmetric off-diagonal matrix element and transposed off-diagonal matrix element and corresponding diagonal matrix elements of the transfer matrix.

2. The method according to claim 1, which further comprises, in the device for processing data, determining the at least one off-diagonal matrix element of the transfer matrix by equation:

$$H(n,k) = H(k,n) \cdot \frac{H(n,n)}{H(k,k)}$$

wherein
H(n,k), H(k,n) are off-diagonal entries of the transfer matrix; and
H(k,k), H(n,n) are diagonal parts of the transfer matrix.

3. The method according to claim 1, wherein the transfer matrix at least one of represents and is associated with wires of a cable binder.

4. The method according to claim 1, which further comprises, in the device for processing data, processing the data by utilizing the transfer matrix for at least one of noise cancellation purposes and for precoding purposes.

5. The method according to claim 4, wherein the noise includes at least one of crosstalk, interference and alien noise.

6. The method according to claim 1, wherein the communication channel connects the central office and the equipment of at least two customer premises.

7. The method according to claim 1, wherein the communication channel connects at least one transmitter with at least one receiver.

8. The method according to claim 1, which further comprises performing the method in a MIMO environment.

9. The method according to claim 1, which further comprises performing the method in a MIMO environment containing at least one of digital subscriber lines and mobile radio links.

10. A device for processing data, comprising:
   a processor unit programmed to:
      perform a method for processing data transmitted via a communication channel connecting a central office and equipment at at least two customer premises, the communication channel having a first portion from the central office via a cable binder and a second portion from the cable binder to the equipment at the customer premises;
      represent the communications channel via a transfer matrix having a first transfer matrix for the first portion and a second transfer matrix for the second portion; and
      determine at least one off-diagonal matrix element of the transfer matrix by at least one of its symmetric off-diagonal matrix element and transposed off-diagonal matrix element and corresponding diagonal matrix elements of the transfer matrix.

11. The device according to claim 10, wherein the device is a communication device selected from the group consisting of the Central Office, a Digital Subscriber Line Access Multiplexer and the Equipment at the Customer Premises.

12. The device according to claim 10, further comprising means for noise processing.

13. The device according to claim 12, wherein said means for noise processing is selected from the group consisting of a precoder and a noise canceller.

14. The device according to claim 10, wherein the device is associated with a communication device selected from the group consisting of the Central Office, a Digital Subscriber Line Access Multiplexer and the Equipment of Customer Premises.

15. A communication system, comprising:
- a device for processing data having a processor unit programmed to:
  - perform a method for processing the data transmitted via a communication channel connecting a central office and equipment at at least two customer premises, the communication channel having a first portion from the central office via a cable binder and a second portion from the cable binder to the equipment at the customer premises;
  - represent the channel via a transfer matrix having a first transfer matrix for the first portion and a second transfer matrix for the second portion; and
  - determine at least one off-diagonal matrix element of the transfer matrix by at least one of its symmetric off-diagonal matrix element and transposed off-diagonal matrix element and corresponding diagonal matrix elements of the transfer matrix.

\* \* \* \* \*